US009780601B2

(12) United States Patent
Markhovsky et al.

(10) Patent No.: US 9,780,601 B2
(45) Date of Patent: Oct. 3, 2017

(54) BATTERY ASSISTED POWER

(71) Applicant: SEAGATE TECHNOLOGY LLC, Cupertino, CA (US)

(72) Inventors: Felix Markhovsky, Saratoga, CA (US); Ashutosh Razdan, San Jose, CA (US); Philip Yin, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 982 days.

(21) Appl. No.: 13/909,296

(22) Filed: Jun. 4, 2013

(65) Prior Publication Data

US 2014/0354047 A1    Dec. 4, 2014

(51) Int. Cl.
| *H02J 1/10* | (2006.01) |
| *H02J 7/34* | (2006.01) |
| *H02J 7/00* | (2006.01) |
| *H02J 1/14* | (2006.01) |

(52) U.S. Cl.
CPC .............. *H02J 7/34* (2013.01); *H02J 7/0068* (2013.01); *H02J 1/14* (2013.01); *Y10T 307/344* (2015.04); *Y10T 307/549* (2015.04); *Y10T 307/625* (2015.04)

(58) Field of Classification Search
CPC ........................................................ H02J 7/34
See application file for complete search history.

(56) References Cited

U.S. PATENT DOCUMENTS

| 5,650,669 A | 7/1997 | Aldous |
| 6,212,226 B1 | 4/2001 | Newton |
| 6,455,953 B1 * | 9/2002 | Lam ......................... H02J 9/005 307/23 |
| 6,864,664 B2 | 3/2005 | Clift |
| 7,746,032 B2 | 6/2010 | Tupman et al. |
| 7,791,314 B2 | 9/2010 | Bucur et al. |
| 8,022,662 B2 | 9/2011 | Eager et al. |
| 8,217,619 B2 | 7/2012 | Sander et al. |
| 8,301,921 B2 | 10/2012 | Goodnow et al. |
| 2012/0068542 A1 | 3/2012 | Alappat |
| 2015/0056476 A1 * | 2/2015 | Roohparvar .......... H02J 7/0063 429/7 |

FOREIGN PATENT DOCUMENTS

| EP | 2252344 B1 | 10/2012 |
| JP | 2000-245073 A | 9/2000 |
| JP | 2001-320893 A | 11/2001 |
| JP | 2005-137139 A | 5/2005 |
| JP | 2005137139 | 5/2005 |

OTHER PUBLICATIONS

ISR, US, Nov. 18, 2014.
Written Opinion, US, Nov. 18, 2014.
International Preliminary Report on Patentability; for PCT Application No. PCT/US2014/040951 issued Dec. 8, 2015, pp. 1-9.

* cited by examiner

*Primary Examiner* — Daniel Cavallari

(57) ABSTRACT

An apparatus includes a rechargeable battery, a circuitry, and a controller. The circuitry is operable to receive power from a power source and to provide power to the rechargeable battery and to other electrical components of the apparatus. The controller is configured to monitor power requirements of the apparatus. Moreover, the controller is further configured to provide power from the rechargeable battery in addition to power supplied from the power source during a peak power event of the apparatus.

18 Claims, 12 Drawing Sheets

BATTERY ASSISTED POWER

BACKGROUND

Electronic devices may be powered and charged by connecting them to a power source. Some devices may have temporary or persistent power requirements that exceed the amount of power that the power source is capable of supplying, e.g., during peak power events.

SUMMARY

According to one embodiment, a device receives power from a power source. The device may cause the battery to provide power in addition to the power from the power source during peak power events.

An apparatus includes a rechargeable battery, a charge circuitry, and a controller. The charge circuitry is operable to receive power from a power source and to provide power to the rechargeable battery and to other electrical components of the apparatus. The controller may be configured to monitor power requirements of the apparatus. Moreover, the controller is further configured to provide power from the rechargeable battery in addition to power supplied from the power source during a peak power event of the apparatus.

These and various other features and advantages will be apparent from a reading of the following detailed description.

BRIEF DESCRIPTION OF DRAWINGS

Embodiments are illustrated by way of example, and not by way of limitation, in the figures of the accompanying drawings and in which like reference numerals refer to similar elements.

DETAILED DESCRIPTION

Figure 1A:
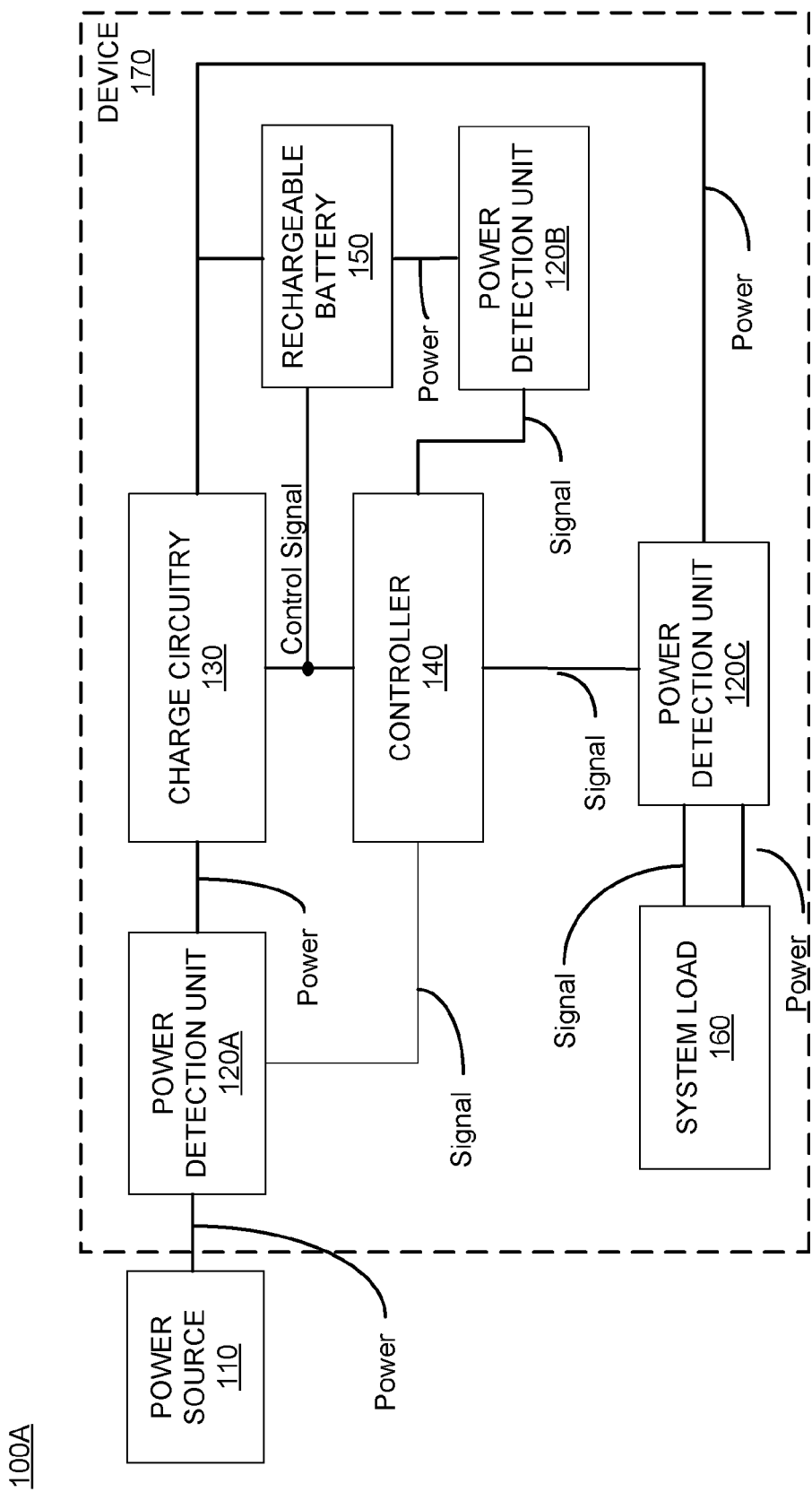
FIGS. 1A-1D show device configurations for battery assisted power, according to some aspects of the present embodiments.

According to embodiments described herein, an electronic device with a battery can mitigate peak power events while connected to an external power source by supplementing or replacing the external power source with power from the battery. In other embodiments, the speed that a battery is discharged is reduced, regardless of whether a device protects the power source from supplying more current than its maximum output current limit or whether the power requirements of the device exceed the amount of power available from the power source. Furthermore, the speed with which the battery is turned on and off is reduced, according to one embodiment, thereby lengthening the life span of the battery. It is appreciated that the power source manufacturer may specify the maximum current output limit, and it is the amount of current that can be safely drawn from the power source.

Some devices protect the power source by disconnecting the device from the power source if the device power requirements exceed that of the maximum output current limit of the power source. Furthermore, some devices may require more power during peak power events than available from the power source. Such an event may stop the supply of power from the power source, thereby causing power to be supplied from the battery. Accordingly, the battery may be depleted rapidly. Once the battery capacity drops below a certain threshold, the battery stops being discharged and the protection circuitry disables the battery power. This may cause the battery to repeatedly turn on and off. It is appreciated that the peak power events may occur at different times, e.g., during an initial startup, a wakeup period of the device, a spin up of a motor, a temporary increase on processor utilization, dynamic amplification of a wireless signal, etc.

According to one embodiment, the power requirements of the device are monitored. If the power requirements of the device exceed the power available from the power source or exceed the power associated with the maximum output current limit of the power source, then the power differential between the power available from the power source (whether it is the power associated with the maximum output current limit or whether it is the maximum power that can be supplied) and the power requirements of the device is determined. Then, in one embodiment, the rechargeable battery supplies the entire power requirement, thus maintaining power supply from the power source. In other embodiments, instead of supplying the entire needed power from the battery, only the power differential is provided using the battery. As such, in one embodiment, the rate of battery discharge is slowed, thereby improving battery life. In other embodiments, the present disclosure enables the device to remain fully functional during the peak power event due to the power from the battery.

In one embodiment, a device may include a rechargeable battery, a monitoring circuit, and a controller. The monitoring circuit is configured to monitor power, e.g., power requirements of the device, power supplied from the power source, power associated with charge/discharge of the battery, etc. The controller is configured to program a charge circuitry (which may include a regulator such as a buck regulator) to cause the rechargeable battery to supply the power differential. As a result, the device receives power from the power source in response to determining that power requirements of the device exceed the power supplied by the power source. The power differential may be supplied during a peak power event, e.g., an initial startup, during a wakeup period of the device, etc.

Referring now to FIG. 1A a device configuration for battery assisted power according to one embodiment is shown. System 100A includes a power source 110 for supplying power to the device 170. The device 170 includes power detection units 120A-120C, charge circuitry 130 (also known as or including a load manager or coulomb counter in some embodiments), a controller 140, a rechargeable battery 150, and other circuitries of the device referred to as system load 160. In some embodiments, the system 100A is implemented with one of the following interface standards: USB 2.0, USB 3.0, SATA, eSATA, Thunderbolt, Lightning, Firewire, or other AC or DC sources. It is appreciated that the device 170 may be a portable electronic device such as a cellular phone, a mobile phone, a smart phone, a digital camera, a portable storage device, a storage device such as a hard drive or a solid state drive, a Wi-Fi enabled storage device, a tablet, a laptop, a portable media player, etc.

According to one embodiment, the controller 140 may determine the amount of power being supplied by the power source 110 and may further determine the power requirements of the device 170, e.g., system load 160. The controller 140 may cause the power source 110 to supply the necessary power to the system load 160 and further cause the charge circuitry 130 to provide the excess of power or substantially all of the power received from the power source 110 to charge the rechargeable battery 150, e.g., Lithium Ion battery, Nickel Cadmium battery, etc. It is appreciated that the controller 140 may cause the rechargeable battery 150 to be charged simultaneously with the power source 110 supplying power to the system load 160, if the power requirements of the device 170, e.g., power requirements of the system load 160, do not exceed the amount of power being supplied from the power source 110. In some embodiments, system load 160 may include one or more of the following: visual display devices, wireless interfaces, wired interfaces such as USB, processors, motors for spinning discs, LEDs, storage media, amplifiers, speakers or the like.

In some embodiments, when the amount of power supplied from the power source 110 is less than the power requirements of the device 170, e.g., power requirements of the system load 160, the controller 140 directs either the entire power received or remainder power received from the power source 110 to the system load 160. Moreover, the controller 140 may direct additional power needed to satisfy the power requirements of the system load 160 from the rechargeable battery 150. In other words, the rechargeable battery 150 provides the differential power, e.g., the difference between the power requirements of the system load 160 and the power received from the power source 110. As such, the rechargeable battery 150 does not discharge as rapidly as in systems where the entire power, to satisfy the power requirements of the system load 160, was being supplied from the rechargeable battery 150.

It is appreciated that the amount of power being supplied from the power source 110 may correspond to the maximum current output limit of the power source 110. Furthermore, the device 170 may have a shutting off mechanism to protect the power source 110 from supplying more current than it can safely provide. In such devices, the controller 140 may receive the maximum current output limit associated with the power source 110, as specified by the manufacturer or standard setting organization, or it may be determined by another component (not shown) and communicated to the controller 140. Alternatively, for example, the maximum current output limit may be communicated via the power source 110 to the controller 140. In various embodiments, a number of maximum current output limits associated with various interconnection interfaces may be stored in a memory component accessible by the controller 140.

However, it is appreciated that the amount of power being supplied from the power source 110 may exceed the maximum current output limit if the device 170 is not equipped with the shutting off mechanism. It is appreciated that on occasion the amount of power required by the system load 160 may exceed the amount being supplied by the power source 110 either because the power source 110 is being protected or because the power source 110 is incapable of providing more power than its threshold (regardless of whether it is being damaged).

It is appreciated that one or more of the power detection units 120A-120C may be optional. Using two power detection units enables the controller 140 to determine the power requirements of the device 170 and the system load 160. Using at least two power detection units enables the controller 140 to determine whether the power source 110 is capable of supplying power to the system load 160 while charging the battery 150, or whether additional power from the battery 150 is required to satisfy the power requirements of the system load 160.

According to one embodiment, the power detection units 120A-120C may include sense resistors for detecting the amount of current being supplied to a given component. The amount of current through the sense resistor may be used to determine the amount of power. For example, the amount of current through the power detection unit 120A may be used to determine the amount of power being supplied from the power source 110. On the other hand, the amount of current through the power detection unit 120B may be used to determine the amount of power being supplied to or from the rechargeable battery 150. In contrast, the amount of current through the power detection unit 120C may be used to determine the amount of power for the system load 160.

It is appreciated that power may be monitored via other means. For example, power monitoring may be accomplished using inductive elements. If an inductive element is used, the field may be measured and the amount of current going through the inductive element may be derived. Using only two power detection units and their functionality is discussed in greater detail with respect to other topologies of the embodiments in systems 100B-100D (see FIGS. 1B-1D).

Figure 1B:
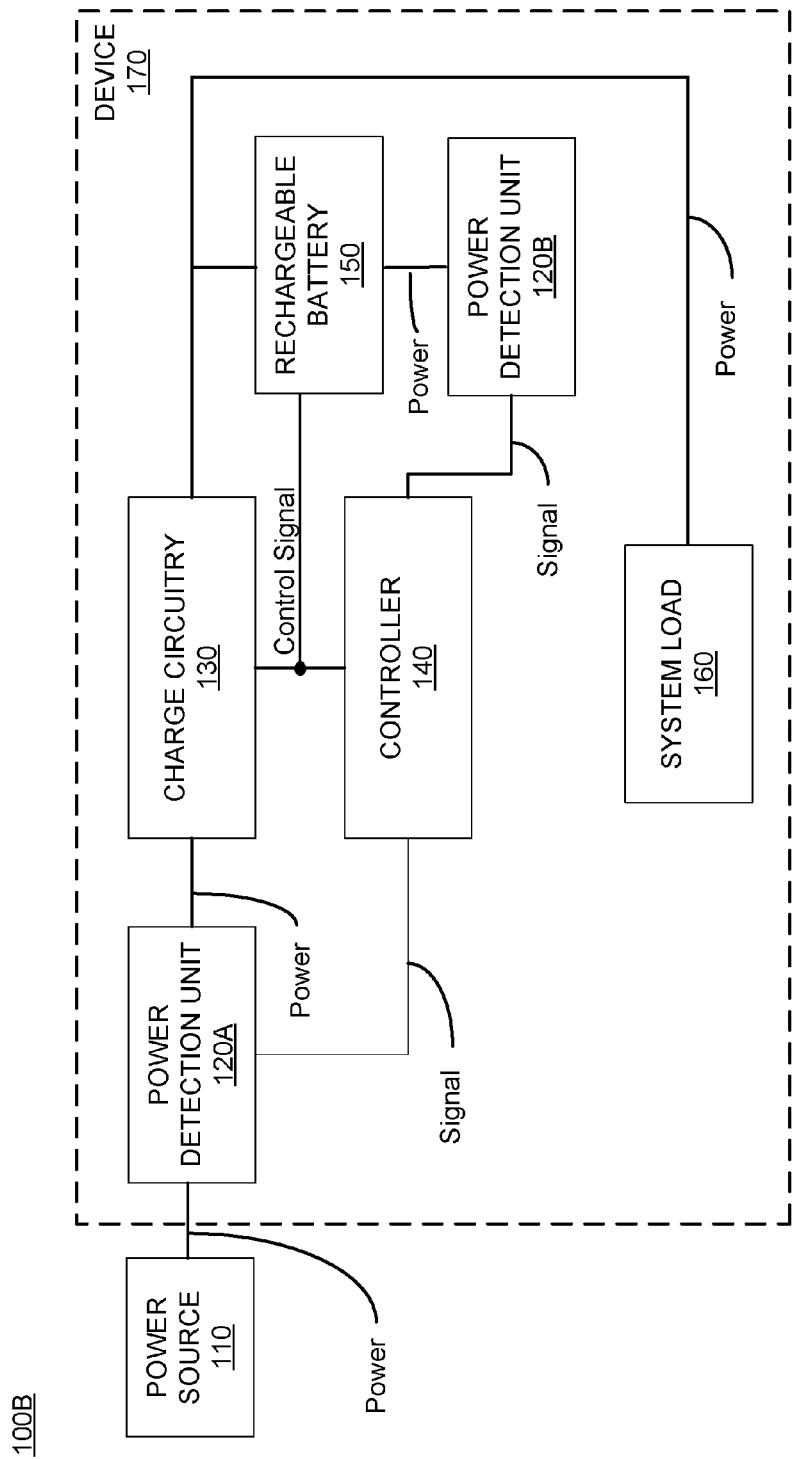

Referring now to FIG. 1B, a device configuration for battery assisted power according to a topology of one embodiment is shown. In this topology, only two power detection units 120A and 120B are used. However, the power requirements of the device, e.g., of the system load 160, may still be determined. For example, the power detection unit 120A may be used to determine the power supplied from the power source 110. In contrast, the power detection unit 120B may be used to determine the amount of power being supplied to or supplied from the rechargeable battery 150.

According to one embodiment, if the power detection unit 120A detects no power but power detection unit 120B detects power being discharged from the battery 150, the controller 140 may determine that the power requirements of the system 160 exceed that of the power being supplied from the power source 110. As such, the supply of power from the power source 110 is blocked. The controller 140 may then cause the power source 110 to supply power, e.g., maximum amount of power without damaging the power source 110 or maximum power source capacity regardless of any damage to the power source 110, to the charge circuitry 130. The controller 140 causes the remainder of the power needed to satisfy the power requirements of the system load 160 to be supplemented via the rechargeable battery 150.

In contrast, if the power detection unit 120A detects power while the power detection unit 120B detects that the rechargeable battery 150 is being charged, the controller 140 may determine that the power requirements for the system load 160 do not exceed the power from the power source 110. As such, the battery 150 is charged simultaneously with the power source 110 providing sufficient power to the system load 160.

Figure 1C:
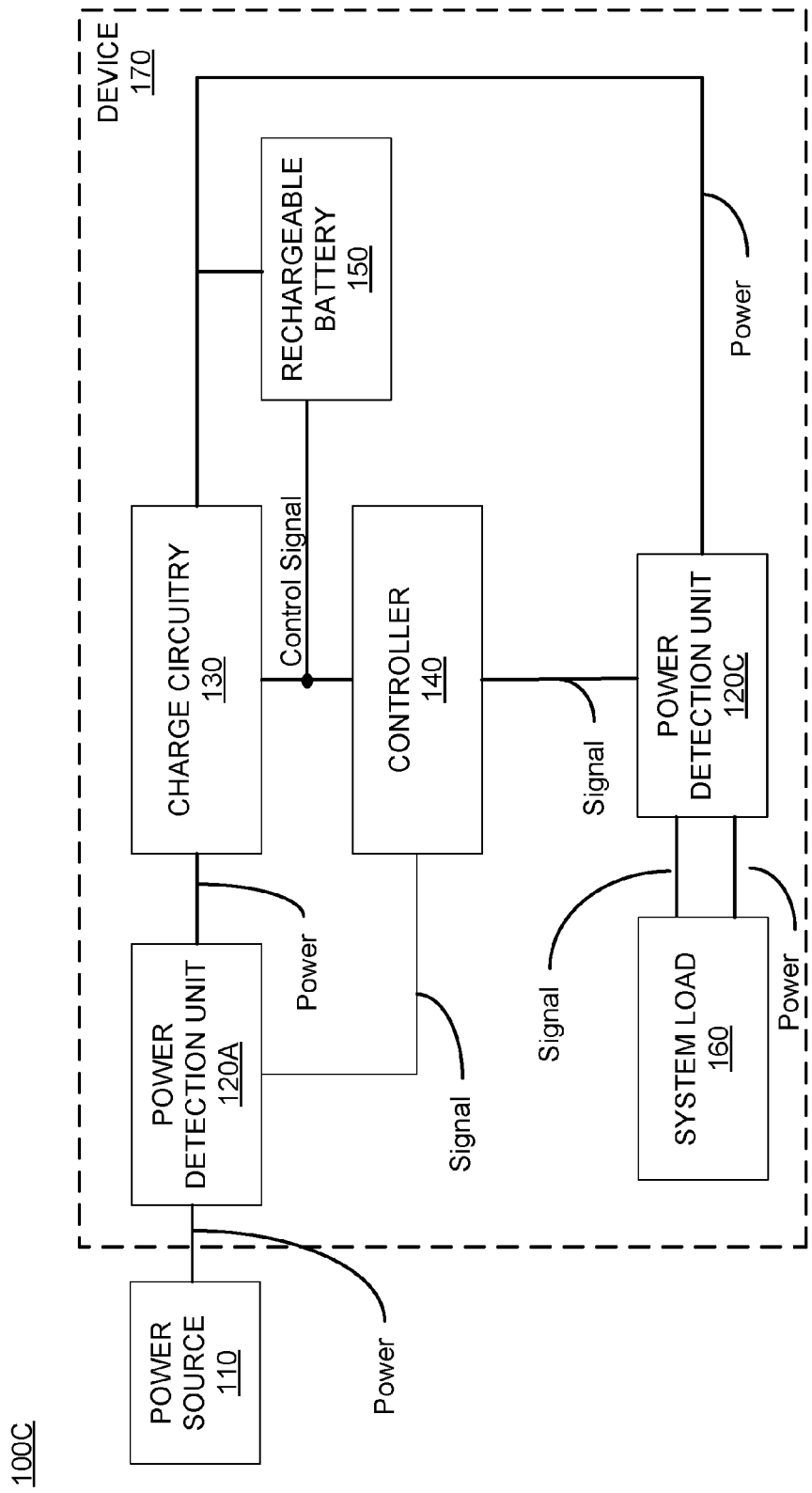

Referring now to FIG. 1C, a device configuration for battery assisted power according to a topology of one embodiment is shown. In this topology, only two power detection units 120A and 120C are used. However, the power requirements of the device, e.g., of the system load 160, may still be determined. For example, the power detection unit 120A may be used to determine the power supplied from the power source 110. In contrast, the power detection unit 120C may be used to determine the power requirements of the system load 160.

According to one embodiment, the controller 140 may determine whether the power requirements of the system load 160, as detected by the power detection unit 120C, exceed the amount of power supplied from the power source 110, as detected by the power detection unit 120A. The controller 140 may determine that the power requirement of the system load 160 exceeds that of the power source 110. As a result, the controller 140 may cause the rechargeable battery 150 to supply the differential power, thereby supplementing the power received from the power source 110. It is appreciated that the differential power may be the difference between the power requirements of the system load 160 and the power supplied from the power source 110.

In contrast, the controller 140 may cause the charge circuitry 130 to charge the rechargeable battery 150, if it determines that the power requirement of the system load 160 is less than the power supplied through the power source 110. The amount of power being supplied to the rechargeable battery 150 in this situation may be equal to the difference between the power requirements of the system load 160 and the power supplied through the power source 110.

Figure 1D:
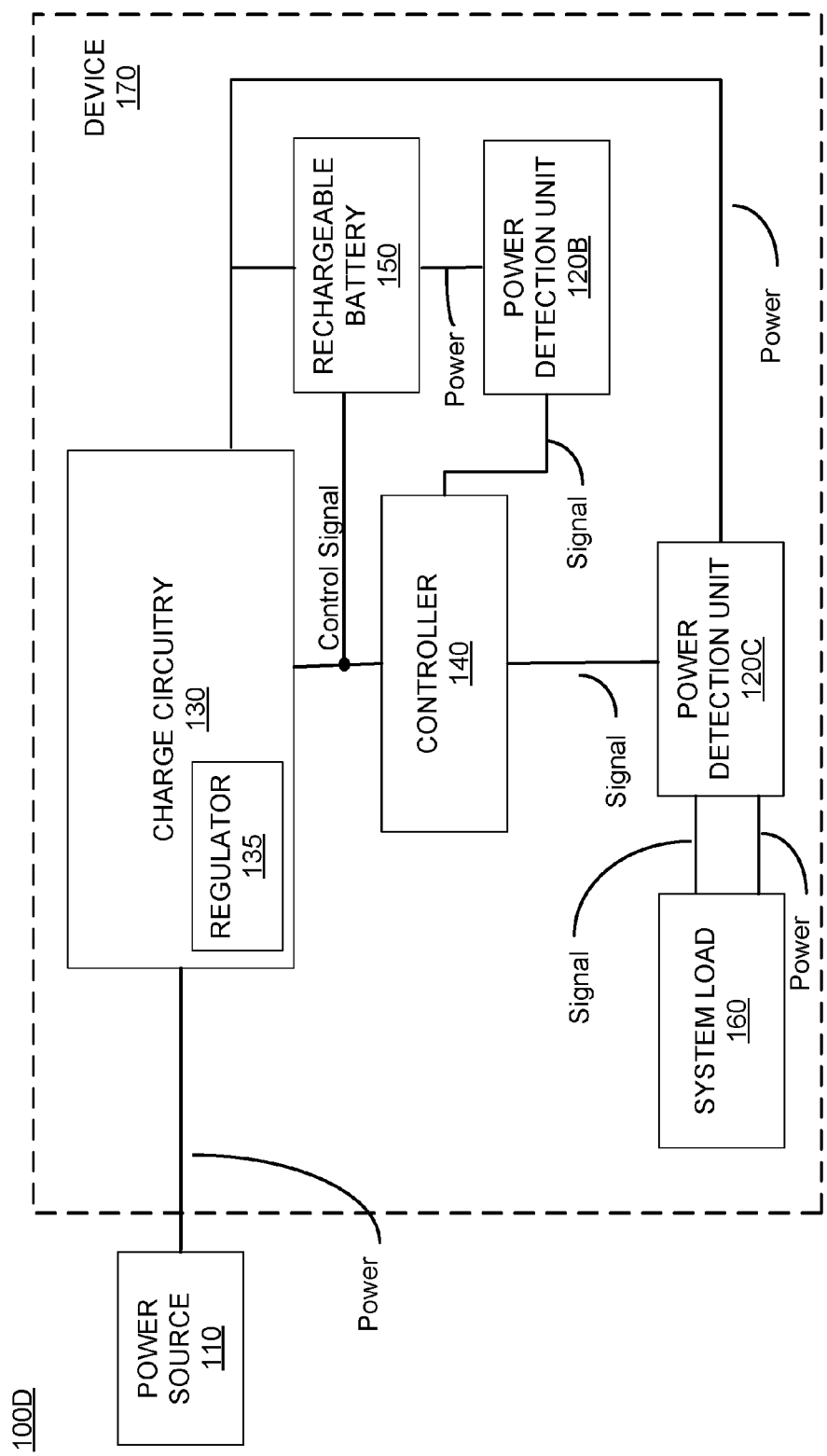

Referring now to FIG. 1D, a device configuration for battery assisted power according to a topology of one embodiment is shown. In this topology, only two power detection units 120B and 120C are used. However, the power requirements of the device, e.g., of the system load 160, may still be determined. For example, the power detection unit 120B may be used to determine the amount of power to or from the rechargeable battery 150. In contrast, the power detection unit 120C may be used to determine the power requirements of the system load 160.

According to one embodiment, the controller 140 may determine whether the battery 150 is being charged or discharged. If the battery 150 is being charged, then the controller 140 may determine that the power supplied from the power source 110 is greater than the power requirements of the system load 160.

In contrast, the controller 140 may determine that the power requirements of the system load 160 exceed the amount of power from the power source 110. In such cases, the amount of power being discharged from the rechargeable battery 150, as detected via the power detection unit 120B, may be equal to the power requirements of the system load 160, as detected via the power detection unit 120C. Accordingly, the controller 140 may cause the charge circuitry 130 to receive power from the power source, and may further cause the rechargeable battery 150 to supply the differential power to satisfy the power requirements of the system load 160. The differential power may be the difference between the power requirements of the system load 160 and the power from the power source 110.

It is appreciated that the controller 140 may configure the charge circuitry 130, thereby causing the differential power to be supplied from the battery 150 in all topologies discussed above. For example, the charge circuitry 130 may include a regulator 135, e.g., buck regulator, buck boost regulator, linear regulator, etc. The controller 140 may configure the regulator 135 to maintain substantially the same voltages from both the rechargeable battery and the power source. If the voltage of the rechargeable battery 150 is substantially equivalent to the voltage from the power source 110, both the rechargeable battery 150 and the power source 110 supply power. In other words, maintaining substantially the same voltage of the rechargeable battery 150 as that of the power source 110 causes the power source 110 to provide the maximum amount of power, thereby causing the rechargeable battery 150 to supply the differential power, as discussed above. It is appreciated that the rechargeable battery 150 supplies only the differential power in order to supplement the power from the power source 110, thereby slowing its discharge rate and lengthening its life span.

Figure 2:
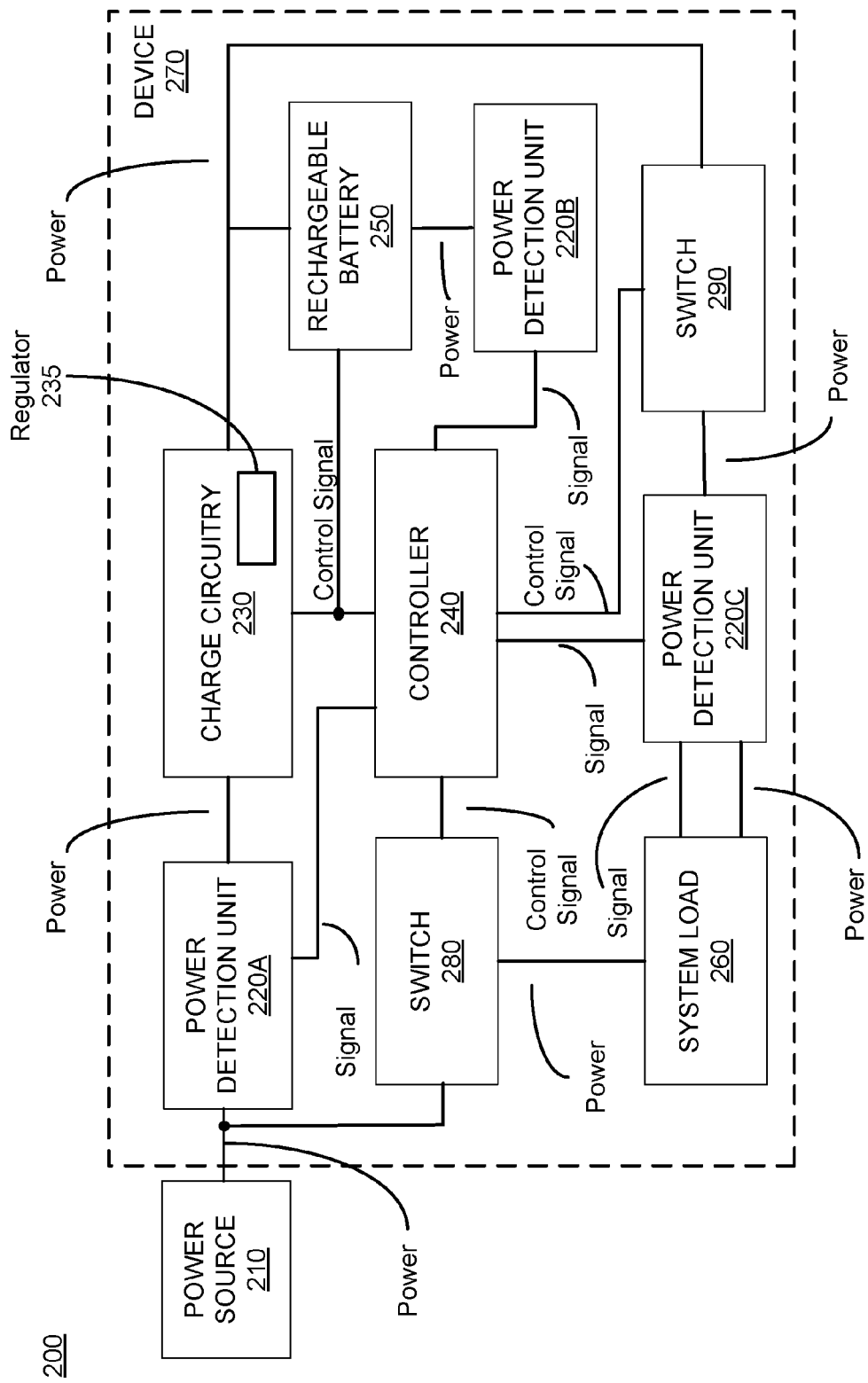
FIG. 2 shows a battery assisted power device, according to one aspect of the present embodiments.

Referring now to FIG. 2, a battery assisted power device in accordance with one embodiment is shown. System 200 functions similar to that of systems 100A-100D. However, system 200 includes switches 280 and 290. In one embodiment, the controller 240 may cause the switch 290 to open and the switch 280 to close, if the power requirements of the system load 260 are less than the amount of power from the power source 210. Accordingly, the power source 210 may provide power required to satisfy the power requirements of the system load 260 via the switch 280, while the remainder of its available power is provided to charge the rechargeable battery 250.

On the other hand, the controller 240 may cause the switch 290 to close and switch 280 to open, if the power requirements of the system load 260 are greater than the amount of power from the power source 210. Accordingly, the controller 240 may configure the charge circuitry 230, e.g., via a buck regulator, in order to maintain substantially the same voltage at the rechargeable battery 250 and the power source 210. As such, the power source 210 supplies a maximum amount of power, and the remainder of the power required by the system load 260 is supplied via the rechargeable battery 250. In other words, the rechargeable battery 250 supplies the differential power.

Figure 3A:
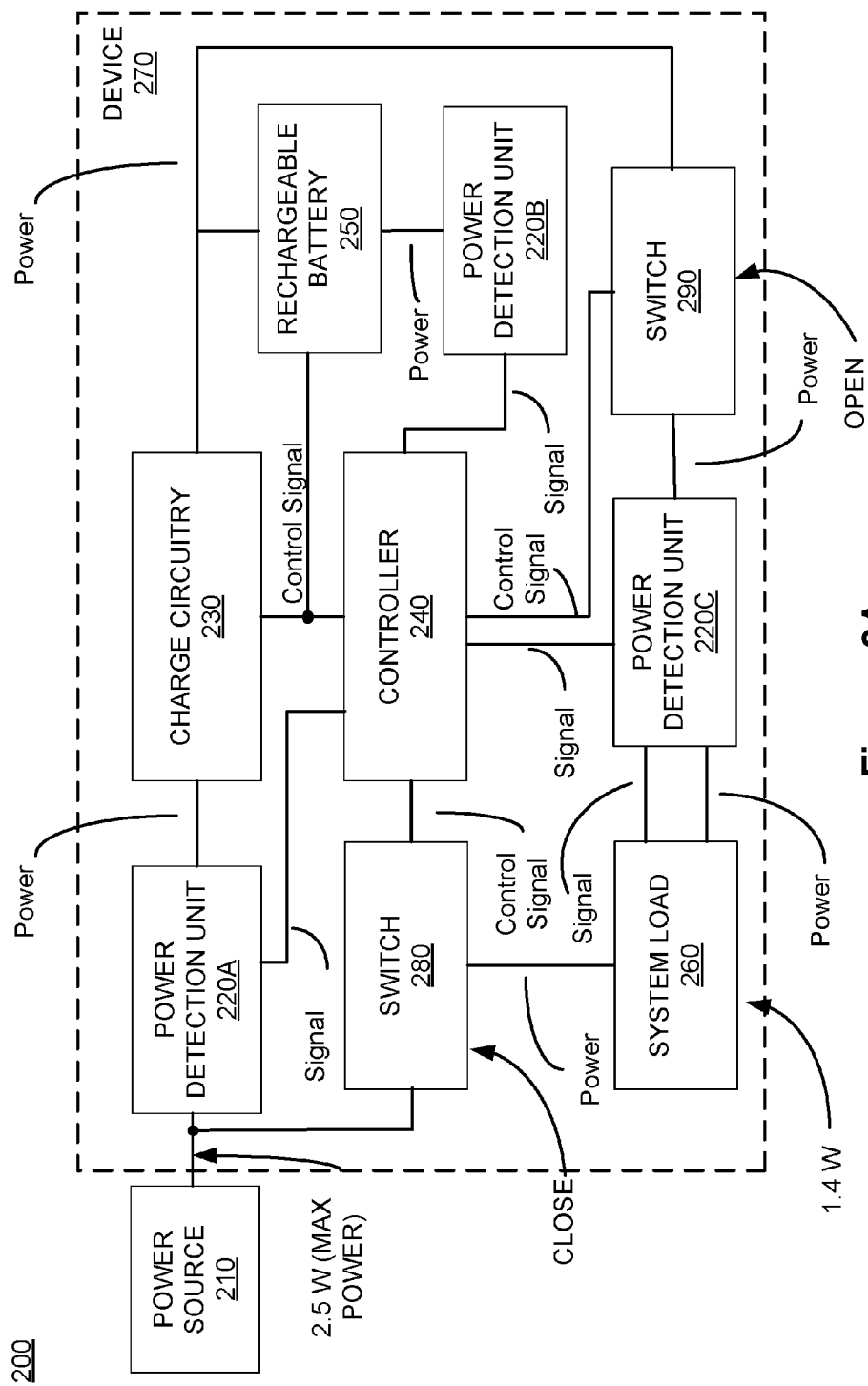
FIGS. 3A-3E show operation of a battery assisted power device, according to one aspect of the present embodiments.

Referring now to FIG. 3A, an example operation of a battery assisted power device in accordance with one embodiment is shown. FIG. 3A is substantially similar to the system 200 described in FIG. 2. In this example, it is assumed that the power source 210 can provide a maximum of 2.5 W. Further, in this example, the power requirement associated with the system load 260 is 1.4 W. As a result, the controller 240 causes the switch 280 to close while switch 290 opens. As a result, the system load 260 receives the power it requires from the power source 210. However, there is an excess power from the power source 210. Therefore the controller 240 causes the charge circuitry 230 to receive the remainder of the power from the power source 210 that is 1.1 W and charge the rechargeable battery 250.

Figure 3B:
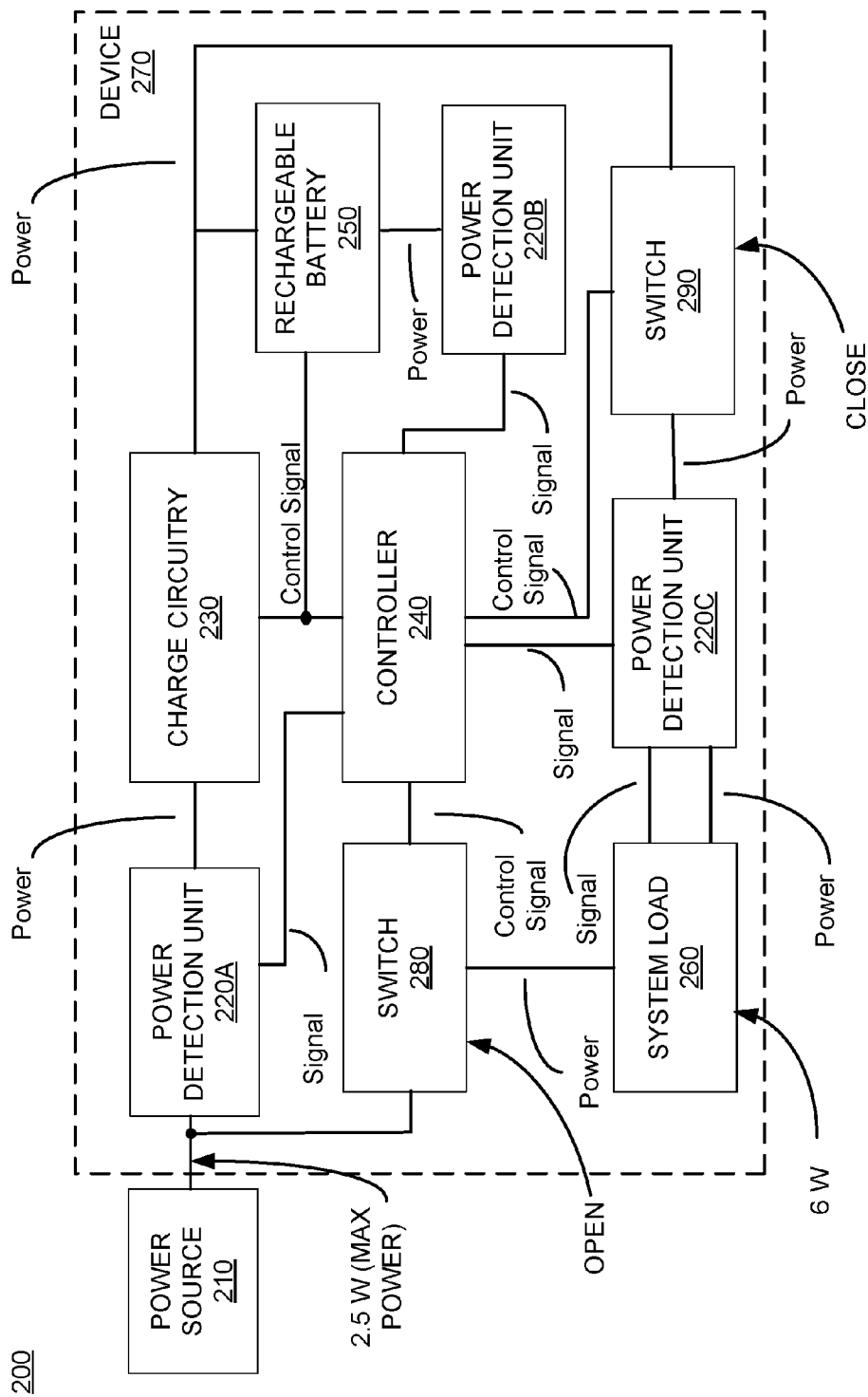

Referring now to FIG. 3B, an example of operation of a battery assisted power device during a peak power event in accordance with one embodiment is shown. In this example, the power source 210 is capable of providing 2.5 W of power. However, a peak power event such as wake up event or initial setup may occur that requires more power, e.g., 6 W in this example. Thus, instead of supplying the entire power from the battery, only the power differential is supplied from the battery in accordance with various embodiments.

In this example, the controller 240 opens the switch 280 while it closes switch 290. Moreover, the controller 240 configures the charge circuitry 230 that may include a regulator 235, e.g., buck regulator, buck boost regulator, linear regulator, etc., to maintain substantially the same voltage from the rechargeable battery 250 and the power source 210. As such, the power source 210 supplies the 2.5 W power while the rechargeable battery 250 supplies the remainder or the differential power, e.g., 3.5 W. Since switch 290 is closed and switch 280 is open, the power from the rechargeable battery 250 and the power from the power source 210 are combined and become the 6 W that that the system load 260 requires.

Figure 3C:
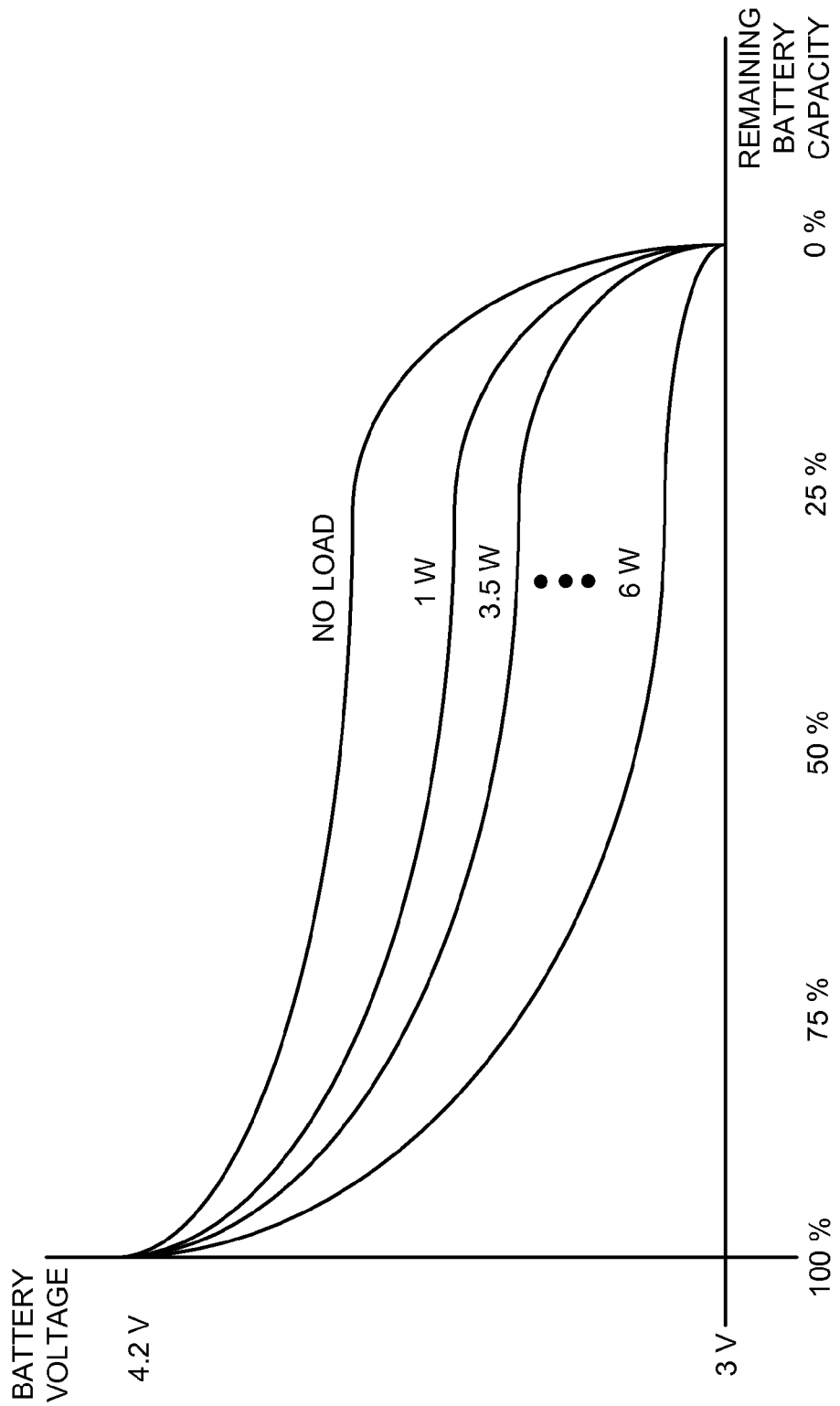

Referring to FIG. 3C, one example for configuring the charge circuitry according to one embodiment is shown. FIG. 3C illustrates examples of battery voltage curves for various loads. For example, the curve for no load is higher than the curve for 1 W, 3.5 W, and 6 W. It is appreciated that any number of these curves may be present and is not limited to four, as shown. The battery voltage curves may be stored in a memory component of the device 170, or 270. A desired curve may be determined after the differential power required from the battery is identified. For example, in FIG. 3B, the differential power is 3.5 W. As such, the curve for the 3.5 W is identified among all the battery curves available. Once the 3.5 W is identified, the charge circuitry that includes a regulator, e.g., buck regulator, buck boost regulator, linear regulator, etc., may be programmed with a pulse width modulation signal based on the identified curve. As such, the voltage from the battery is substantially the same as the voltage from the power source. Therefore, both the power source and the rechargeable battery supply power, wherein the power source supplies the power it can and the rechargeable battery supplies the power differential needed for the system load.

Figure 3D:
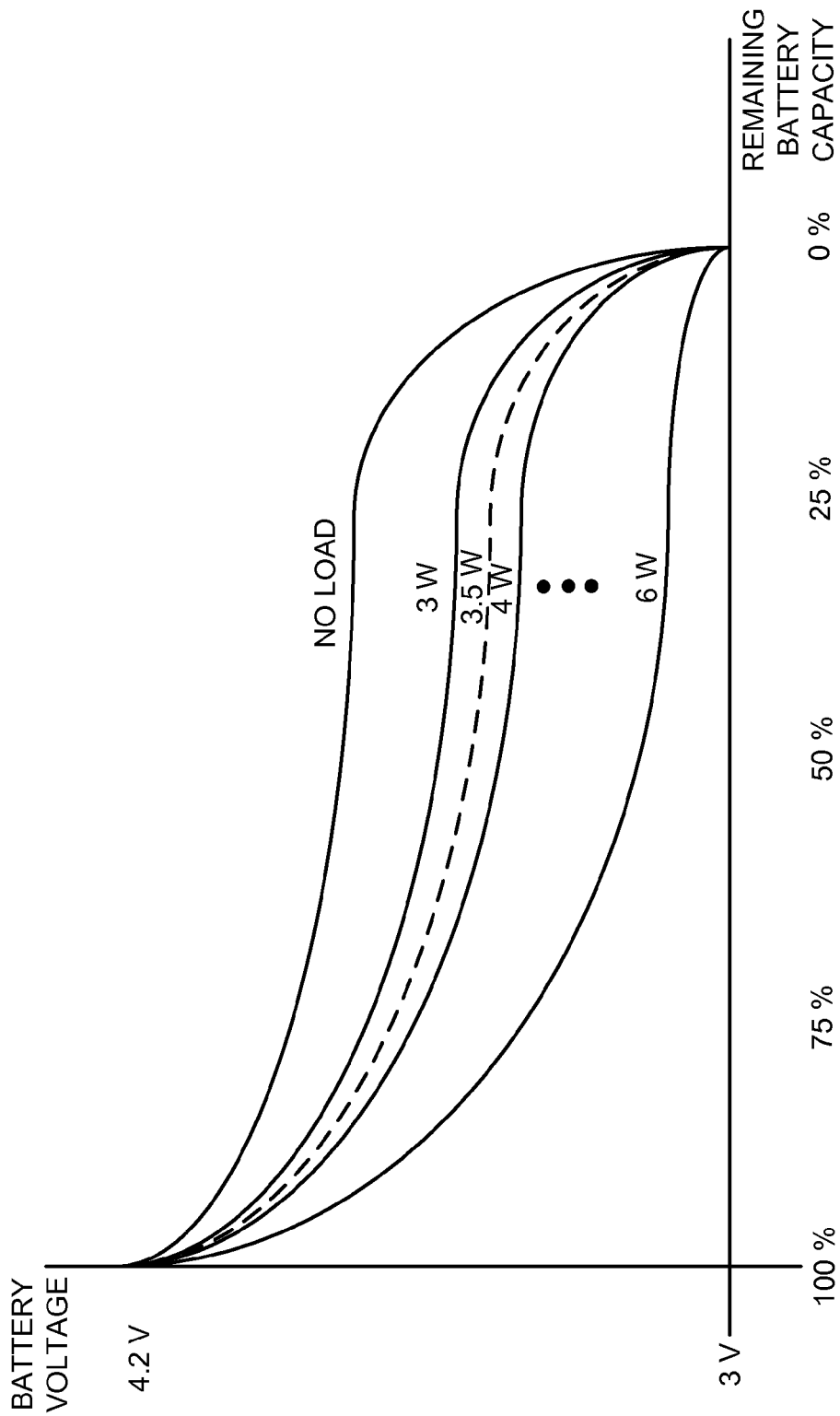

Referring now to FIG. 3D, one example for configuring the charge circuitry according to one embodiment is shown. This example is substantially similar to that of FIG. 3C except that the battery voltage curve for a 3.5 W power differential is not readily available. However, battery voltage curves for no load, 3 W, 4 W, and 6 W are available. Therefore, the battery voltage curve for the 3.5 W power differential may be interpolated in this example. For instance, it may be interpolated that the battery voltage curve for 3.5 W should be somewhere in between the 3 W and the 4 W curves. It is appreciated that this process may continue until the desired curve is derived.

Figure 3E:
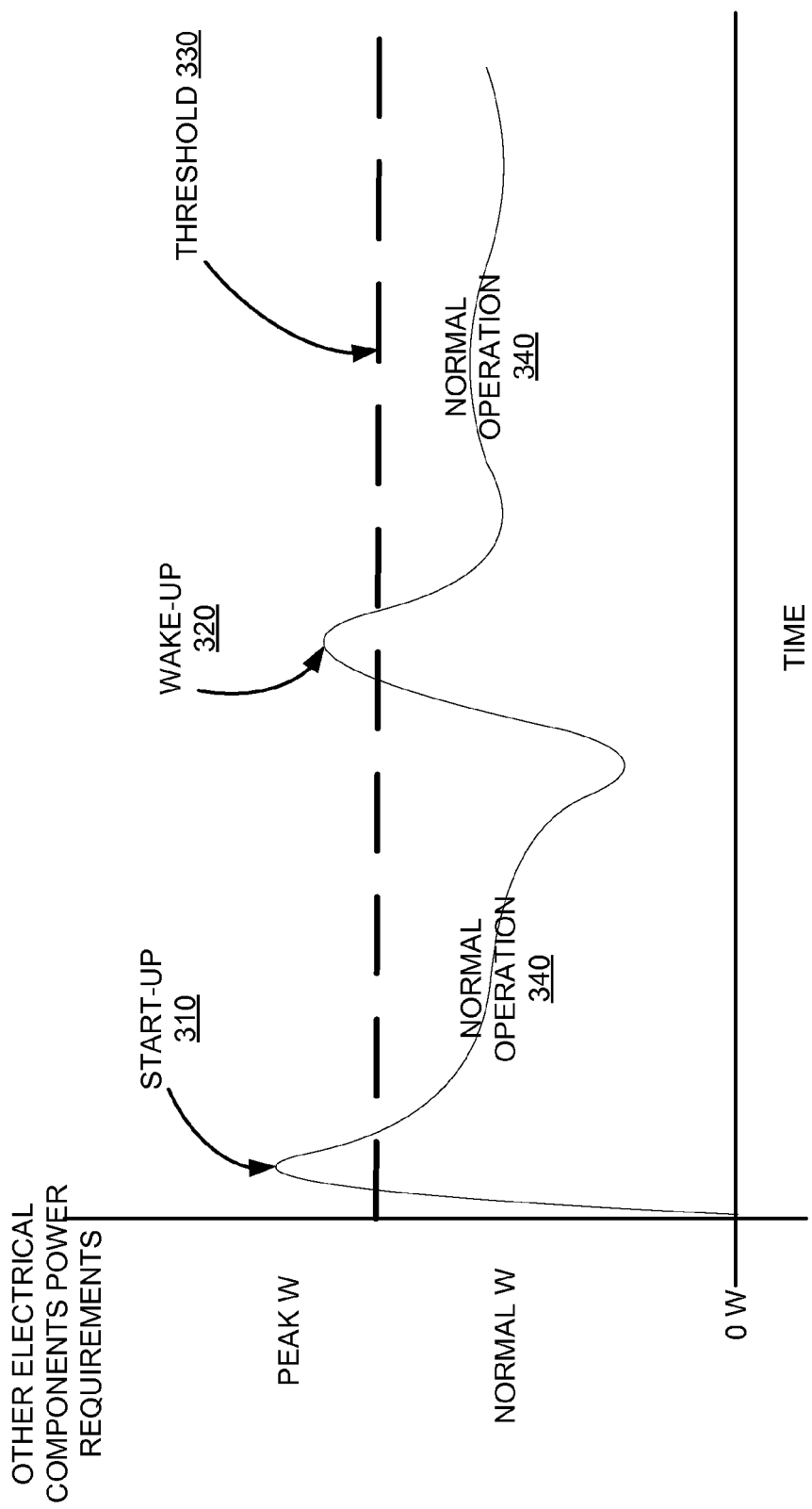

Referring now to FIG. 3E, one example of utilizing supplemental battery power during operation of a device according to one embodiment is shown. In this graph, the X-axis represents time a device is operating and the Y-axis represents power requirements of the other electrical components of the device besides the battery. The first peak event that causes the required voltage to go over threshold 330 is start-up event 310. This can occur when, for example, an external storage device or wireless mobile device is turned on. Supplemental power from the battery can be used while the voltage requirement remains above threshold 330. After the start-up 310, a device will usually return to a normal operation 340 where the voltage requirements are below the threshold 330. In some embodiments, a device may go to a sleep state and then perform a wake-up 320 operation, again possibly causing the voltage to peak above the threshold. At this point supplemental power from the battery could be used again before the device returns to a normal operation 340 state. The relative ratios and time intervals in FIG. 3E are meant for illustration purposes only and should not be read to be limiting.

Once the desired curve is identified, the charge circuitry that may include a regulator such as a buck regulator, buck boost regulator, linear regulator, etc., may be programmed. The regulator may be programmed using a pulse width modulation signal based on the identified battery voltage curve. As such, the voltage from the battery follows the voltage from the power source and is substantially the same.

Thus, the rechargeable battery supplies the differential power to supplement the supply of power from the power source to the system load.

Figure 4:
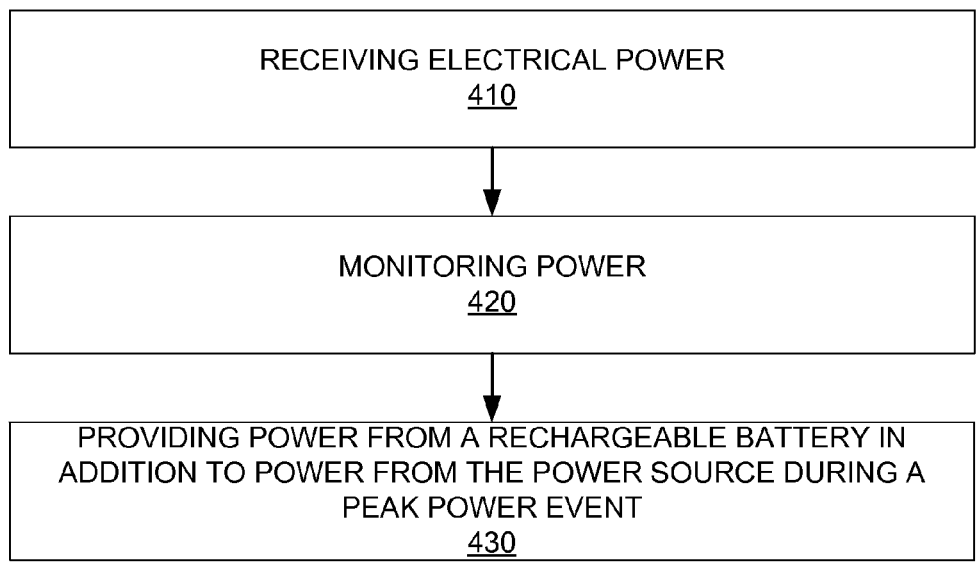
FIG. 4 shows a flow diagram for a battery assisted power device, according to one aspect of the present embodiments.

Referring now to FIG. 4, a flow diagram 400 for a battery assisted power device in accordance with one embodiment is shown. At step 410, electrical power may be received for a device, e.g., a portable electronic device such as a cellular phone, a mobile phone, a smart phone, a digital camera, a portable storage device, a storage device such as a hard drive or a solid state device, a Wi-Fi enabled storage device, a tablet, a laptop, a portable media player, etc. It is appreciated that the electrical power received from the power source may range from 0 W to a given wattage value where its absolute value is greater than zero.

At step 420, power may be monitored. For example, power requirements of the system load may be monitored. Moreover, power to or from the rechargeable battery may be monitored. Furthermore, power from the power source may be monitored. It is appreciated that one of the aforementioned power monitoring may be optional.

At step 430, power from the rechargeable battery may supplement the power from the power source during peak power events, e.g., startup, wake-up, etc. It is appreciated that the power from the rechargeable battery may be a differential power, which is the difference between the power requirements of the system load and the power supplied from the power source.

Figure 5:
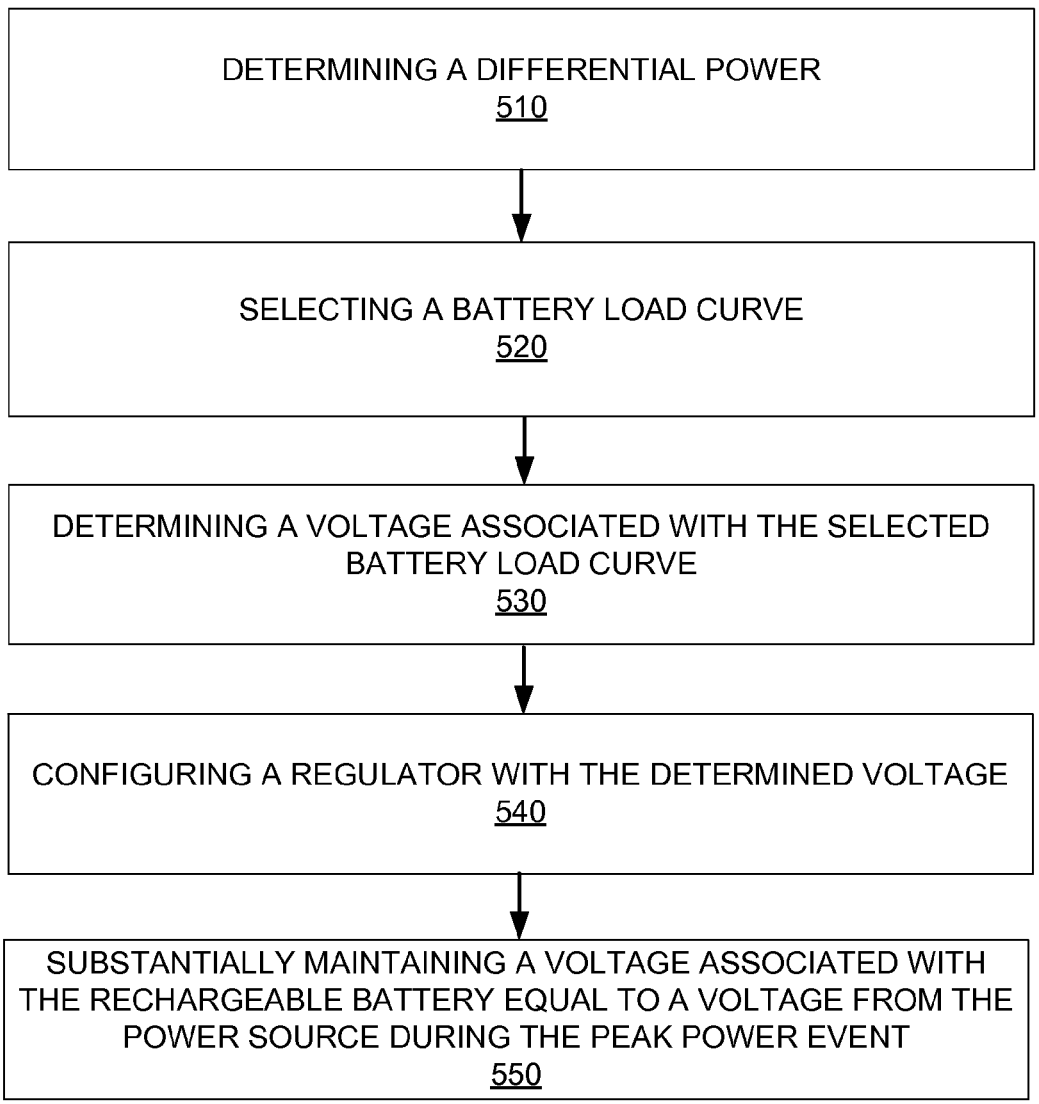
FIG. 5 shows a flow diagram for configuring a device to operate in a battery assisted power fashion, according to one aspect of the present embodiments.

Referring now to FIG. 5, a flow diagram 500 for configuring a device to operate in a battery assisted power fashion in accordance with one embodiment is shown. At step 510, the differential power is determined. It is appreciated that the differential power may be the difference between the power from the power source and the power requirements of the system load. The differential power may be determined using a controller in conjunction with at least two power monitoring systems, e.g., two of the power detection units 120A-120C.

Once the differential power is determined, a corresponding voltage battery curve is identified. For example, at step 520, a voltage battery curve corresponding to the differential power may be selected from a plurality of voltage battery curves. It is appreciated that the voltage battery curve corresponding to the differential power may be interpolated from the existing voltage battery curves, if the exact voltage battery curve corresponding to the differential power does not exist.

At step 530, a voltage associated with the selected voltage battery curve may be determined. In order to have the power source supply power while the rechargeable battery supplies the differential power, the voltage of the rechargeable battery should follow the voltage associated with the power source. In other words, the voltage associated with the battery is substantially the same as the voltage from the power source.

Accordingly, at step 540, the charge circuitry may include a regulator that may be configured based on the selected voltage battery curve and further based on the voltage of the power source. In one embodiment, the regulator may be configured using a pulse width modulation signal in order to maintain the voltage of the battery as substantially the same as the voltage from the power source. Accordingly, at step 550, the voltage associated with the rechargeable battery substantially equals to the voltage from the power source during peak power events.

As a result, the rechargeable battery is prevented from supplying the entire power to the system load, but instead provides the differential power to supplement the power from the power source. As such, the rate of discharge of the battery is slowed.

An exemplary computer system for charging a battery in accordance with some embodiments includes a bus or other communication mechanism for communicating information, and a processor coupled with bus for processing information. A computer system may implement the method for configuring a device to operate as a battery assisted power device as shown in FIGS. 4-5. The bus is capable of providing power to a device in addition to enabling other functions.

In some embodiments, the present invention is used with a portable hard drive capable battery assisted power. A disk drive may be included as part of the system load described above. The system load may also include a wireless circuitry.

An interface or connector along an exterior of a disk drive or mobile device may be used to provide connectivity between circuitry of the disk drive or mobile device and a next level of integration such as an interposer, a circuit board, a cable connector, a host, or an electronic assembly.

References were made in detail to embodiments, examples of which were illustrated in the accompanying drawings. While the embodiments were described in conjunction with the drawings, it is understood that they were not intended to limit the embodiments. The embodiments are intended to cover alternatives, modifications and equivalents. Furthermore, in the detailed description, numerous specific details were set forth in order to provide a thorough understanding. However, it is recognized by one of ordinary skill in the art that the embodiments may be practiced without these specific details. In other instances, known methods, procedures, components, and circuits have not been described in detail as to not obscure aspects of the embodiments. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The implementations described above and other implementations are within the scope of the following claims.

What is claimed is:

1. An apparatus comprising:
a charge circuitry that receives power from a power source and provides power to a rechargeable battery and to other electrical components;
a controller that controls the rechargeable battery to provide power to the other electrical components during a peak power event in addition to power being supplied by the power source; and
a regulator that maintains a voltage associated with the rechargeable battery equal to a voltage from the power source during the peak power event.

2. The apparatus of claim 1, wherein the rechargeable battery in response to the controller determination of an initial startup or a wakeup period of the apparatus provides power to the other electrical components in addition to power being supplied by the power source.

3. The apparatus of claim 1, wherein the controller controls the rechargeable battery to supply a differential power between a power draw threshold of the power source and a power requirements of the apparatus to protect the power source from being damaged.

4. The apparatus of claim 1, wherein the other electrical components are selected from a group consisting of visual displays, wireless interfaces, processors, motors, LEDs, storage media, amplifiers, and speakers.

5. The apparatus of claim 1, wherein the controller monitors power requirements of the apparatus.

6. The apparatus of claim 1, wherein the apparatus is a portable electronic device selected from the group consisting of storage device, mobile phone, smart phone, digital camera, portable media player, and tablet computer.

7. The apparatus of claim 1, wherein the controller:
determines a differential power between a power draw threshold of the power source and a power requirement of the apparatus;
selects a battery load curve associated with the differential power using a plurality of battery load curves;
determines a voltage associated with the selected battery load curve; and
configures a regulator with the determined voltage that maintains a voltage associated with the rechargeable battery equal to a voltage from the power source during the peak power event.

8. The apparatus of claim 1, wherein the power source is selected from a group consisting of universal serial bus (USB), Thunderbolt, Firewire, Lightning, serial ATA (SATA), AC power adapter and DC power adapter; and
the rechargeable battery is sole power provider during peak power event.

9. A device comprising:
a rechargeable battery;
a power detection unit configured to monitor power; and
a controller that controls both the rechargeable battery and a power source to simultaneously supply power to a system load of the device in response to determining that a power requirement of the device exceeds a maximum power available from the power source, wherein the controller controls the rechargeable battery to supply a differential power between a power draw threshold of the power source and the power requirements of the device to protect the power source from being damaged and the device further comprises:
a second power detection unit.

10. The device of claim 9, wherein the rechargeable battery, in response to the controller determination of an initial startup or a wakeup period of the device and further in response to the controller determination that the power requirement of the device exceeds the maximum power available from the power source, provides power to the system load of the device in addition to power being supplied by the power source.

11. The device of claim 9 further comprising:
a regulator circuit that maintains a voltage associated with the rechargeable battery equal to a voltage from the power source, in response to the determining that the power requirement of the device exceeds the maximum power available from the power source.

12. The device of claim 9 further comprising:
switching circuitry provides a portion of the power from the power source to the system load and further provides another portion of the power from the power source to charge the rechargeable battery that charges the rechargeable battery, the switching circuitry is controlled by the controller determining that the maximum power available from the power source exceeds the power requirement of the device, and
the switching circuitry combines the power from the power source to power from the rechargeable battery in response to the controller determining that the power requirement of the device exceeds the maximum power available from the power source power, and the switching circuitry provides the combined power to the system load.

13. An Apparatus comprising:
a charge circuitry that receives power from a power source and provides power to a rechargeable battery and to other electrical components; and
a controller that controls the rechargeable battery to provide power to the other electrical components during a peak power event in addition to power being supplied by the power source, wherein the controller controls the rechargeable battery to supply a differential power between a power draw threshold of the power source and a power requirements of the apparatus to protect the power source from being damaged.

14. The apparatus of claim 13, wherein the rechargeable battery in response to the controller determination of an initial startup or a wakeup period of the apparatus provides power to the other electrical components in addition to power being supplied by the power source.

15. The apparatus of claim 13, wherein the apparatus is a portable electronic device selected from the group consisting of storage device, mobile phone, smart phone, digital camera, portable media player, and tablet computer.

16. A device comprising:
a rechargeable battery;
a power detection unit configured to monitor power;
a controller that controls both the rechargeable battery and a power source to simultaneously supply power to a system load of the device in response to determining that a power requirement of the device exceeds a maximum power available from the power source; and
a switching circuitry provides a portion of the power from the power source to the system load and further provides another portion of the power from the power source to charge the rechargeable battery that charges the rechargeable battery, the switching circuitry is controlled by the controller determining that the maximum power available from the power source exceeds the power requirement of the device, and the switching circuitry combines the power from the power source to power from the rechargeable battery in response to the controller determining that the power requirement of the device exceeds the maximum power available from the power source power, and the switching circuitry provides the combined power to the system load.

17. The device of claim 16, wherein the rechargeable battery, in response to the controller determination of an initial startup or a wakeup period of the device and further in response to the controller determination that the power requirement of the device exceeds the maximum power available from the power source, provides power to the system load of the device in addition to power being supplied by the power source.

18. The device of claim 16 further comprising:
a regulator circuit that maintains a voltage associated with the rechargeable battery equal to a voltage from the power source, in response to the determining that the power requirement of the device exceeds the maximum power available from the power source.

* * * * *